United States Patent
Wada et al.

(10) Patent No.: US 7,384,169 B2
(45) Date of Patent: Jun. 10, 2008

(54) LIGHTING DEVICE WITH U-SHAPED FLUORESCENT TUBE

(75) Inventors: Mitsuhiro Wada, Osaka (JP); Tomohisa Tajiri, Osaka (JP)

(73) Assignees: Quanta Display Inc. (TW); Quanta Display Japan Inc., Osaka (JP)

( * ) Notice: Subject to any disclaimer, the term of this patent is extended or adjusted under 35 U.S.C. 154(b) by 181 days.

(21) Appl. No.: 11/261,115

(22) Filed: Oct. 27, 2005

(65) Prior Publication Data

US 2006/0092632 A1    May 4, 2006

(30) Foreign Application Priority Data

Oct. 28, 2004    (JP)    ............... 2004-313658

(51) Int. Cl.
*F21S 4/00*    (2006.01)
*G09F 13/08*    (2006.01)

(52) U.S. Cl. ............... 362/223; 362/97; 362/311; 362/367; 349/64; 349/70

(58) Field of Classification Search ............... 362/97, 362/223, 311, 367; 349/64, 70
See application file for complete search history.

(56) References Cited

U.S. PATENT DOCUMENTS

| | | | | |
|---|---|---|---|---|
| 4,748,546 A | * | 5/1988 | Ukrainsky | ............... 362/223 |
| 5,128,783 A | * | 7/1992 | Abileah et al. | ............... 349/64 |
| 5,161,041 A | * | 11/1992 | Abileah et al. | ............... 349/62 |
| 5,262,880 A | * | 11/1993 | Abileah | ............... 349/70 |
| 5,283,674 A | * | 2/1994 | Hanaoka et al. | ............... 349/64 |
| 5,648,827 A | * | 7/1997 | Shaw | ............... 349/70 |
| 6,100,952 A | * | 8/2000 | Marvin et al. | ............... 349/64 |
| 6,666,569 B2 | | 12/2003 | Obata | ............... 362/339 |
| 6,950,234 B1 | | 9/2005 | Onishi | ............... 359/449 |
| 7,213,933 B2 | * | 5/2007 | Chang et al. | ............... 362/97 |
| 7,237,930 B2 | * | 7/2007 | Onishi et al. | ............... 362/333 |
| 2003/0184993 A1 | * | 10/2003 | Yamada | ............... 362/31 |
| 2005/0243551 A1 | * | 11/2005 | Onishi et al. | ............... 362/244 |

FOREIGN PATENT DOCUMENTS

| | | |
|---|---|---|
| JP | 3114093 | 5/1991 |
| JP | 00804037.0 | 3/2002 |
| JP | 01802178.6 | 12/2002 |

\* cited by examiner

*Primary Examiner*—Ismael Negron
(74) *Attorney, Agent, or Firm*—Martine Penilla & Gencarella, LLP

(57) ABSTRACT

A lighting device including a frame, at least one U-shaped fluorescent tube, a diffusing plate, and a prism sheet having a plurality of prisms and being positioned between the fluorescent tube and the diffusing plate with the prism apices aligned in the axial direction of the fluorescent tube. The prism sheet covers the bent portion of the fluorescent tube to eliminate uneven luminance.

3 Claims, 5 Drawing Sheets

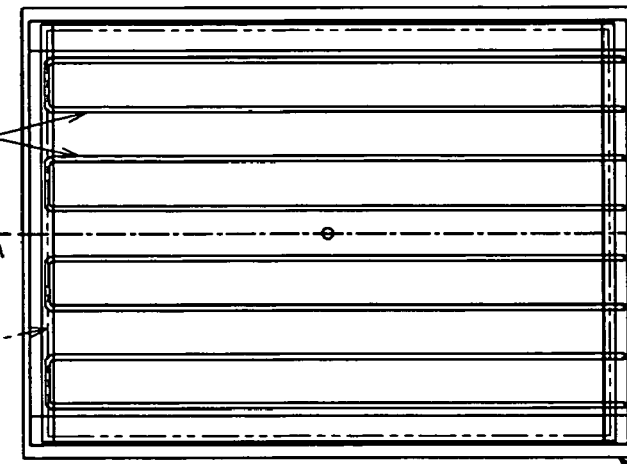
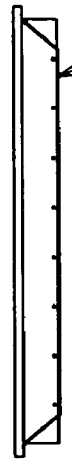
FIG. 1C        FIG. 1A        FIG. 1D
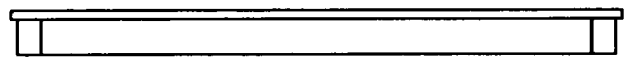
FIG. 1E
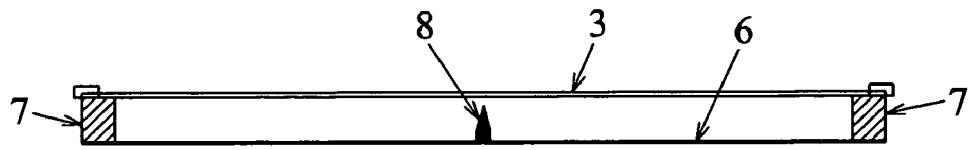
FIG. 1B

| FIG. 5C | FIG. 5A | FIG. 5D |
| (PRIOR ART) | (PRIOR ART) | (PRIOR ART) |

LIGHTING DEVICE WITH U-SHAPED FLUORESCENT TUBE

BACKGROUND OF THE INVENTION a) Field of the Invention

The invention relates to a direct type backlight device for use as a backlight source of a liquid crystal display device.

b) Description of Related Art

Liquid crystal display (LCD) devices used as display apparatuses for microcomputers or television receivers do not emit light themselves, and therefore LCD devices must have a light source such as a lighting device.

Such lighting device commonly uses small diameter fluorescent tubes like cold-cathode tubes or hot-cathode tubes, and can be generally categorized into edge light type or direct type. In the edge light type, fluorescent tubes are placed at the side of a light-guide plate such that light emits from the LCD side of the light-guide plate. In the direct type, a reflecting plate and at least one fluorescent tube are housed inside a frame, wherein the direct light from the fluorescent tube and the reflected light that is the light from the fluorescent tube reflected by the reflecting plate are made incident into a diffusing plate placed at an opening of the frame, and then the light is diffused and emitted as an uniform planar light, forming an illuminated area.

Moreover, to evenly distribute the luminance of the illuminated area, the fluorescent tubes in the direct type lighting device are arranged in parallel with almost equal spacing, and so by arranging the increasing number of fluorescent tubes accordingly, the luminance distribution will not be degraded and the required luminance level can be obtained easily.

As display devices such as monitors and television receivers become larger in size and have higher luminance level, the increase in the number of fluorescent tubes used and the cost start to be problematic. To lower the cost, a method that uses one fluorescent tube to achieve the same luminance level and luminance distribution produced by multiple fluorescent tubes was developed by bending a long fluorescent tube and arranging it in parallel.

FIGS. 5A to 5E show, respectively, the front view, cross-sectional view, side views and bottom view of a conventional direct type lighting device, wherein the conventional lighting device includes: a frame 1; at least one fluorescent tube 2; a diffusing plate 3; an illuminated area 4; a frontal frame 5 for securing the diffusing plate 3 and preventing light leakage from surroundings; a reflecting plate 6 for effectively reflecting light from the fluorescent tube 2; a tube-holding frame 7 for holding the fluorescent tube 2; and a separation plate 8 for keeping a constant distance between the diffusing plate 3 and the reflecting plate 6.

The fluorescent tube 2 is bent at its center section to make at least two portions of the fluorescent tube 2 parallel, and the fluorescent tube 2 is arranged such that the width between the parallel parts of the fluorescent tube 2 is about the same as the distance between one parallel part and adjacent fluorescent tube 2.

However, the light-emitting length of a fluorescent tube per unit of illuminated area at the bent portion is longer than the light-emitting length of a fluorescent tube at the non-bent portion in the aforementioned bent fluorescent tube, and thereby the luminance distribution of the illuminated area is poor.

The current improvement method is to place the bent portion of the fluorescent tube outside of the illuminated area.

Problems to be Solved by the Invention

Because the bent portion of the aforementioned bent fluorescent tube in the direct type lighting device is placed outside of the illuminated area, the lighting device cannot extensively utilize the light from the bent portion of the fluorescent tube. Therefore, how to reduce the consumption of electricity or improve the luminance level becomes a major issue.

For the lighting device to use the light from the fluorescent tube extensively, the bent portion must be arranged in display region, but as aforementioned, the luminance distribution in the illuminated area degrades because the light-emitting length of the fluorescent tube per unit of illuminated area at the bent portion is longer than the light-emitting length of the fluorescent tube at non-bent portion.

BRIEF SUMMARY OF THE INVENTION

Solving Problems

An object of the invention is to provide a lighting device, which can enhance the efficiency of light use at a bent portion of a fluorescent tube and at the same time satisfy the luminance distribution of an illuminated area. Therefore, a structure that can effectively distribute the strong light from the bent portion to the illuminated area is required.

The invention discloses a lighting device, which has a diffusing plate capable of diffusing light emitted from a fluorescent tube secured in a frame. The lighting device is characterized in that the fluorescent tube is bent at at least one point to make at least two portions parallel and at least a part of the bent portion is placed within an illuminated area defined by the diffused and emitted light through the diffusing plate.

A structure for effectively distributing the strong light from the bent portion to the illuminated area is located between the diffusing plate and the fluorescent tube, and has a prism sheet having a plurality of prisms arranged in such a way that the prism apices are in the axial direction of the fluorescent tube.

The invention thus also discloses a lighting device as mentioned above, wherein a prism sheet having a plurality of prisms is placed between the diffusing plate and the fluorescent tube and the prism apices are in the axial direction of the fluorescent tube. Also, the prism sheet is arranged to cover the bent portion of the fluorescent tube.

The invention further discloses another lighting device similar to that mentioned above, wherein the prism ridge direction of each prism of the prism sheet is parallel to the axial direction of the fluorescent tube.

Invention Effects

Therefore, according to the invention, a lighting device, which has a diffusing plate capable of diffusing light emitted from a fluorescent tube secured in a frame, can effectively utilize light emitted from the fluorescent tube because at least a part of a bent portion is placed within an illuminated area. The bent portion is formed by bending at least one point in the fluorescent tube, which makes at least two portions of the fluorescent tube parallel.

In the lighting device aforementioned, if a prism sheet having a plurality of prisms is placed between the diffusing plate and the fluorescent tube in such a way that the prism apices are in the axial direction of the fluorescent tube and the prism sheet can cover the bent portion of the fluorescent tube, light emitted from the fluorescent tube outside of the bent portion of the fluorescent tube covered by the prism sheet can also be effectively utilized.

Moreover, in the lighting device, if the direction of the prism ridge of each prism of the prism sheet is arranged to be parallel to the axial direction of the fluorescent tube, the direction of refraction of the light from the fluorescent tube refracted by the prism sheet that cover the bent portion of the fluorescent tube is 90 degrees to the axial direction of the fluorescent tube. Hence, a more uniform luminance distribution effect is generated.

BRIEF DESCRIPTION OF DRAWINGS

FIG. 1A illustrates a front view of a lighting device according to a first embodiment of the invention.

FIG. 1B illustrates a cross-sectional view of the lighting device of FIG. 1A taken along line B-B.

FIG. 1C and FIG. 1D illustrate side views of a lighting device according to a first embodiment of the invention.

FIG. 1E illustrates a bottom view of a lighting device according to a first embodiment of the invention.

FIG. 5A illustrates a front view of a conventional lighting device.

FIG. 5C and FIG. 5D are side views of a conventional lighting device.

DETAILED DESCRIPTION OF THE INVENTION

Figure 2:
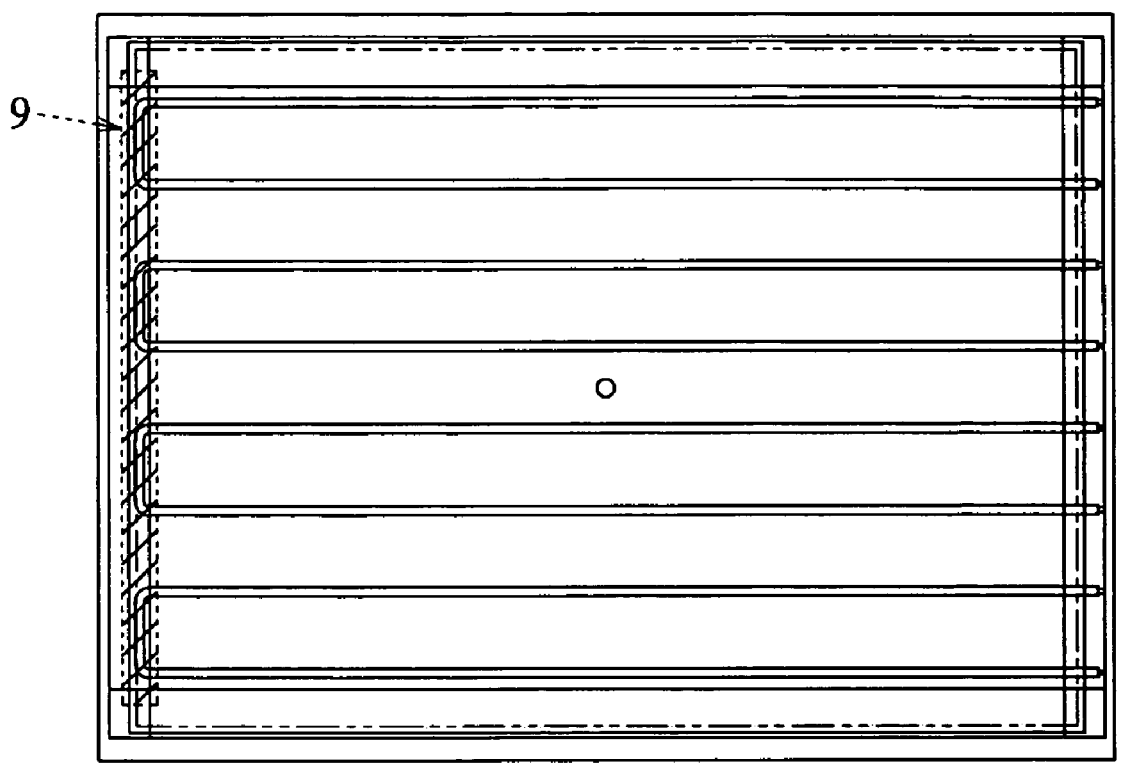
FIG. 2 illustrates an assembly of a prism sheet having a plurality of prisms according to a second embodiment of the invention.
Figure 3A:
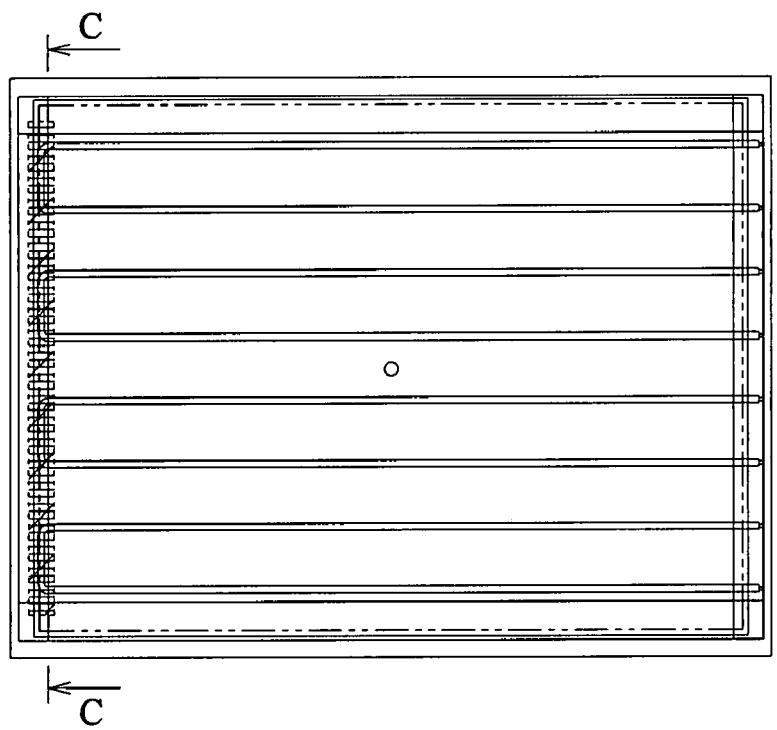
FIG. 3A is a front view illustrating the relationship between a prism sheet having a plurality of prisms and a fluorescent tube according to a third embodiment of the invention.
Figure 3B:
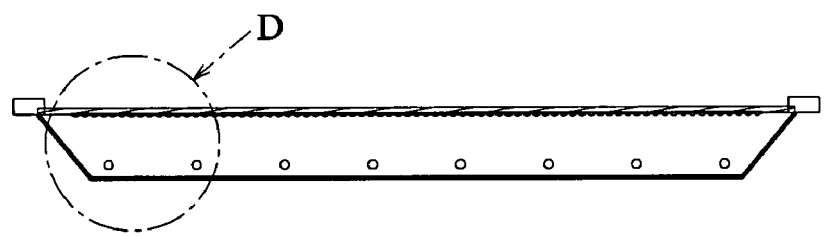
FIG. 3B illustrates a cross-sectional view taken along line C-C of FIG. 3A.
Figure 3C:
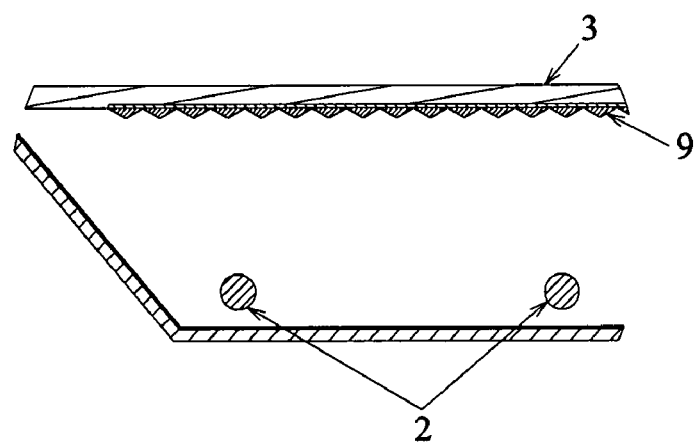
FIG. 3C illustrates an enlarged view of part D in FIG. 3B.

FIGS. 1A to 1E, 2, 3A to 3C, and 4, are referred to for the description of a lighting device according to embodiments of the invention. The descriptions for components of the invention that are common with those of conventional lighting devices are omitted.

FIRST EMBODIMENT

FIGS. 1A to 1E are referred to for the description of a lighting device according to a first embodiment of the invention. FIGS. 1A to 1E illustrate, respectively, the front view, cross-sectional view, side views and bottom view of a lighting device having a frame 1, at least one fluorescent tube 2, a diffusing plate 3, an illuminated area 4, a frontal frame 5 for securing the diffusing plate 3 and preventing light leakage from surroundings, a reflecting plate 6 for effectively reflecting light from the fluorescent tube 2, a tube-holding frame 7 for holding the fluorescent tube 2; and a separation plate 8 for keeping a constant distance between the diffusing plate 3 and the reflecting plate 6. As shown in FIGS. 1A to 1E, the bent portion of the fluorescent tube 2 is placed inside the illuminated area 4. Thus, the light emitted from the bent portion of the fluorescent tube 2 can be effectively utilized in the illuminated area 4.

SECOND EMBODIMENT

FIG. 2 is referred to for the description of a lighting device according to a second embodiment of the invention.

FIG. 2 illustrates a lighting device with a prism sheet 9 according to FIG. 1, wherein the prism sheet 9 having a plurality of prisms is positioned between the fluorescent tube 2 and the diffusing plate 3 with prism apices of the prisms facing down toward the fluorescent tube 2 and covers the bent portion of the fluorescent tube 2. The prism sheet 9 is secured in the tube-holding frame 7 that holds the bent portion of the fluorescent tube 2.

THIRD EMBODIMENT

FIGS. 3A to 3C and 4 are referred to for the description of a lighting device according to a third embodiment of the invention.

FIG. 2 illustrates a lighting device with a prism sheet 9 according to FIG. 1, wherein the prism sheet 9 having a plurality of prisms is positioned between the fluorescent tube 2 and the diffusing plate 3 with prism apices of the prisms facing down toward the fluorescent tube 2 and covers the bent portion of the fluorescent tube 2. The prism sheet 9 does not cover the parallel portion of the fluoresent tube 2. The prism sheet 9 is secured in the tube-holding frame 7 that holds the bent portion of the fluorescent tube 2.

Figure 4:
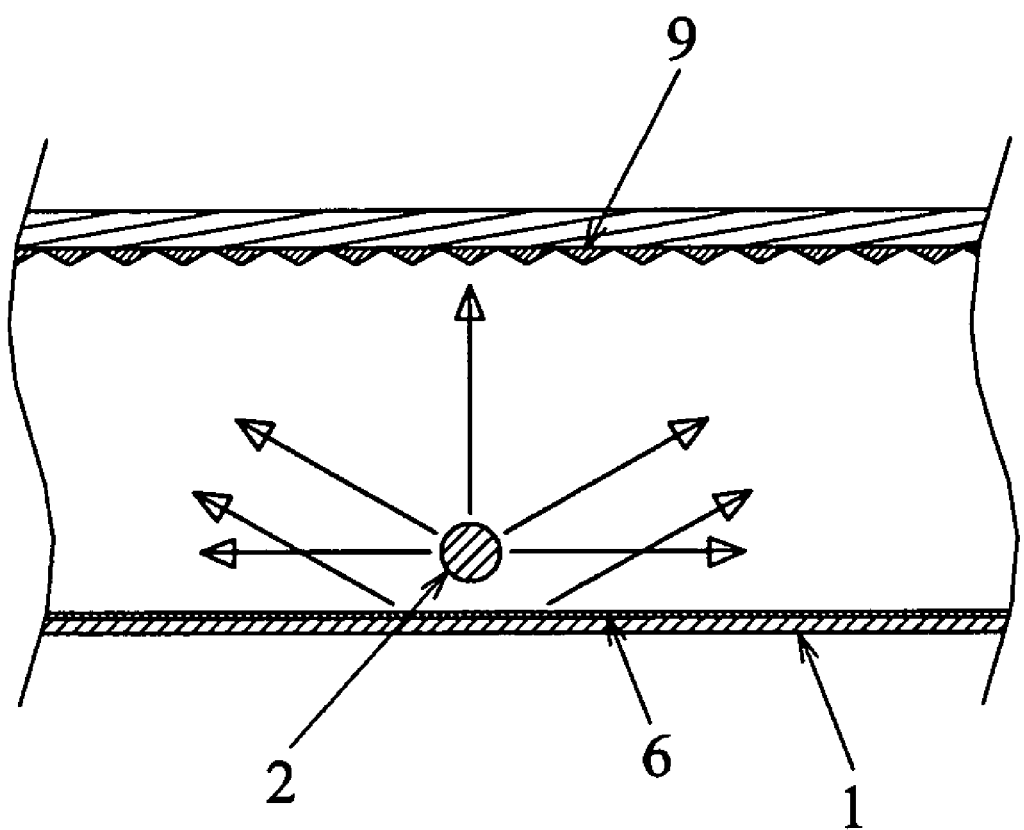
FIG. 4 is a sectional view illustrating the relative relationship of a prism sheet having a plurality of prisms, a fluorescent tube, and light from the fluorescent tube according to a third embodiment of the invention.
Figure 5E:
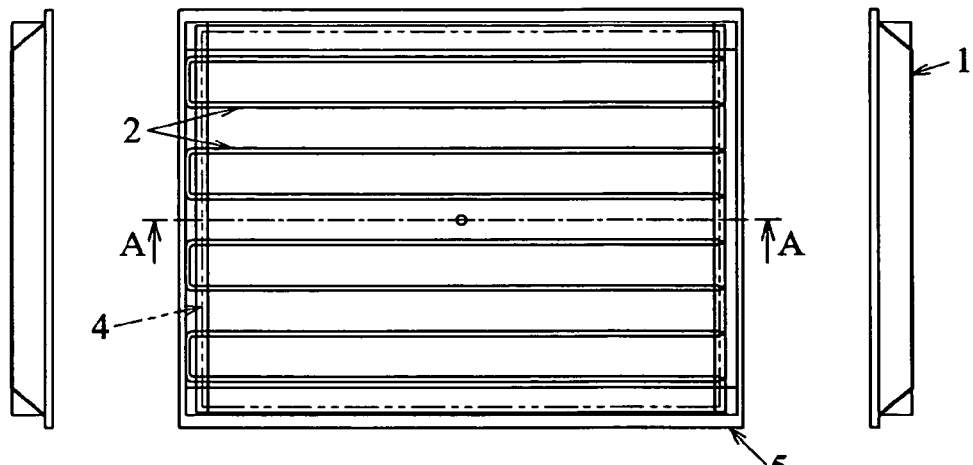
FIG. 5E illustrates a bottom view of a conventional lighting device.
Figure 5E:
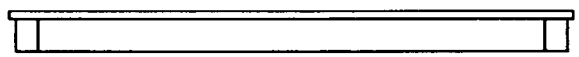
Figure 5B:
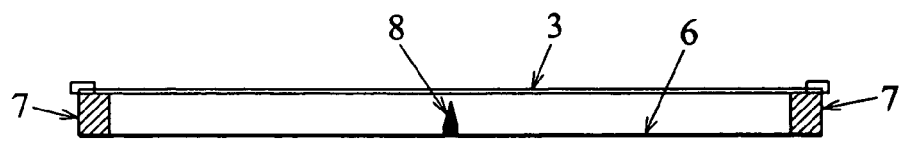
FIG. 5B illustrates a cross-sectional view of a conventional lighting device taken along line A-A of FIG. 5A.

FIG. 4 illustrates the relationship between the fluorescent tube 2, the light emitted from the fluorescent tube 2, and the prism sheet 9. According to Snell's Law of Refraction, the light emitted from the fluorescent tube 2 and entered into the prism sheet 9 cannot pass through the prism sheet 9 and exit in a direction that is 90 degrees to the illuminated area, and so the luminance level at the frontal side of the illuminated area that is 90 degrees to the illuminated area degrades. As a result, the luminance difference between the frontal side of area with the prism sheet 9 and the frontal side of area without the prism sheet 9 is decreased, and thus the luminance difference in the illuminated area is reduced.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:
1. A lighting device, comprising:
a frame;
at least one fluorescent tube secured in said frame;
a diffusing plate, through which light emitted from said fluorescent tube is diffused and emitted, thereby forming an illuminated area; and
a prism sheet having a plurality of prisms positioned between said diffusing plate and said fluorescent tube with prism apices of the prisms facing said fluorescent tube;
wherein said fluorescent tube comprises at least one bent portion and at least two parallel portions, and said at least one bent portion is positioned within said illuminated area, and the prism sheet covers said bent portion of said fluorescent tube without covering said parallel portions of said fluorescent tube.

2. The lighting device as recited in claim 1, wherein a prism apex of each said prisms is arranged to be in an axial direction of said fluorescent tube.

3. The lighting device as recited in claim 2, wherein a direction of a prism ridge of each said prisms is arranged to be parallel to the axial direction of said fluorescent tube.

* * * * *